United States Patent [19]

Fries

[11] 3,995,981
[45] Dec. 7, 1976

[54] FEEDHEAD DEVICE FOR THE MOULDING OF PLASTICS MATERIALS TO BE FORMED FROM A PLURALITY OF LIQUID CONSTITUENTS

[75] Inventor: Bernd Fries, Volkach, Germany

[73] Assignee: Messrs. Demag AG, Germany

[22] Filed: Aug. 8, 1974

[21] Appl. No.: 495,670

Related U.S. Application Data

[63] Continuation of Ser. No. 288,584, Sept. 13, 1972, abandoned.

[30] Foreign Application Priority Data

Sept. 15, 1971 Germany .......................... 2146181

[52] U.S. Cl. ....................... 425/242 R; 425/817 R; 425/DIG. 229
[51] Int. Cl.² ........................................ B29F 1/06
[58] Field of Search ................ 259/4; 264/45.9, 52, 264/176 R, 328, 329; 425/4 C, 817 C, 4, 817 R, 131.1, 133.5, 131.5, 376, 378 R, 378 S, 379 R, 379 S, 245 R, 244, 462, 463, 464, 242 R, DIG. 49, 114, DIG. 229, 247, 248, 249, 250, DIG. 51, 134, 130

[56] References Cited

UNITED STATES PATENTS

| 2,696,640 | 12/1954 | Weinand ........................ 425/114 X |
| 2,770,011 | 11/1956 | Kelly .................................. 425/245 |
| 3,051,453 | 8/1962 | Sluijters ....................... 425/DIG. 49 |
| 3,339,240 | 9/1967 | Corbett ........................ 425/247 X |
| 3,394,924 | 7/1968 | Harder ....................... 425/DIG. 49 |
| 3,577,308 | 5/1971 | Van Drunen et al. ......... 425/131 X |
| 3,669,600 | 6/1972 | McLean, Jr. ...................... 425/245 |
| 3,723,037 | 3/1973 | Formo .......................... 425/244 X |

*Primary Examiner*—Francis S. Husar
*Assistant Examiner*—Mark Rosenbaum
*Attorney, Agent, or Firm*—Marn & Jangarathis

[57] ABSTRACT

The invention relates to a feedhead device for the moulding of plastics materials, especially foamable plastics, to be formed from a plurality of liquid constituents, the device having a mixing chamber charged with the pressurized constituents and a sprue runner adjoining the mixing chamber and leading to a mould cavity. The sprue runner flares toward the mould cavity. To create a uniform distribution of velocity over the cross-section of the sprue runner despite the widening thereof and to prevent the occurrence of evaporation prior to the plastics constituents inter-reacting, the invention proposes the forming of at least one restriction in the sprue runner.

8 Claims, 7 Drawing Figures

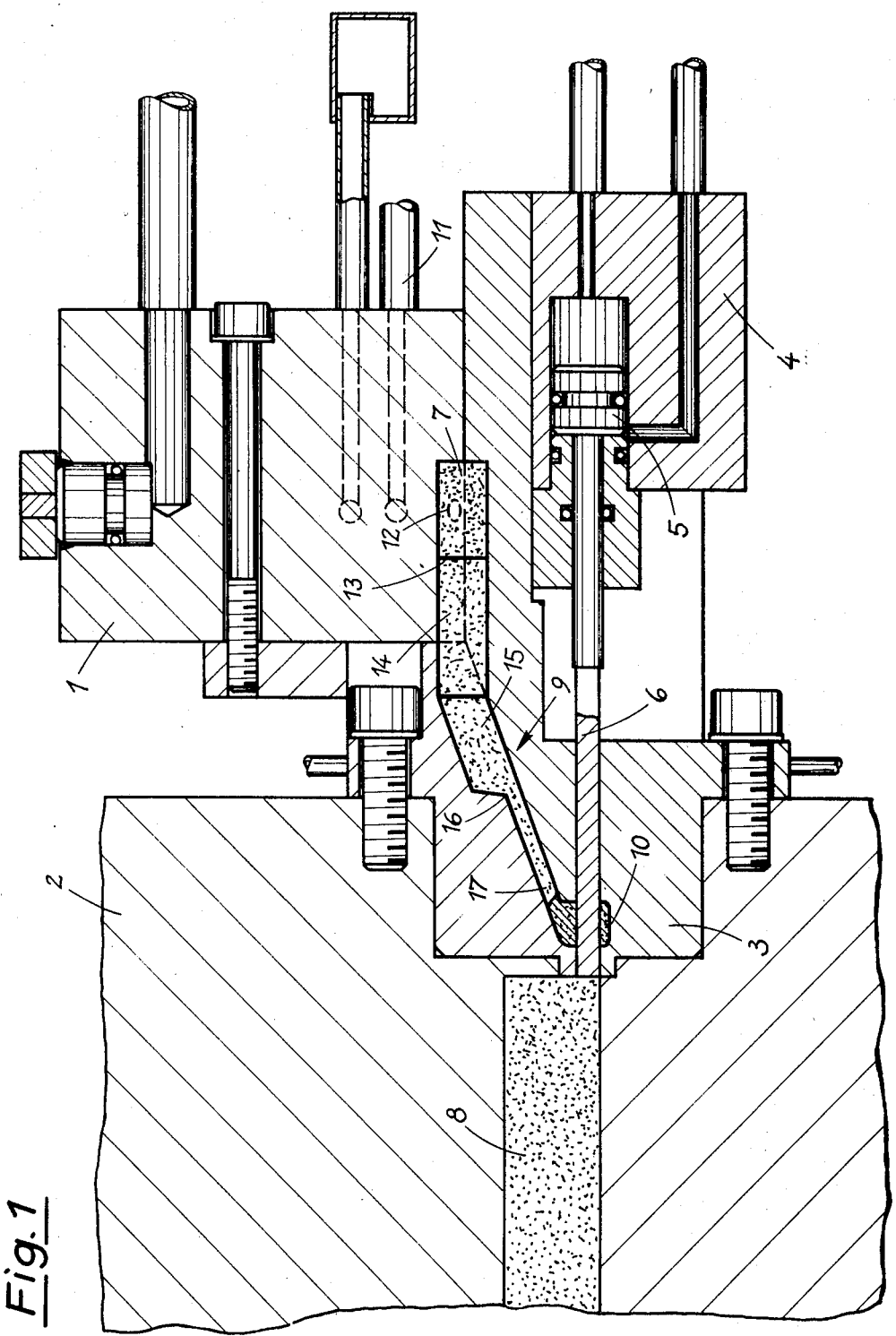

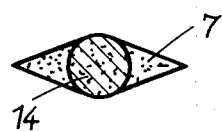
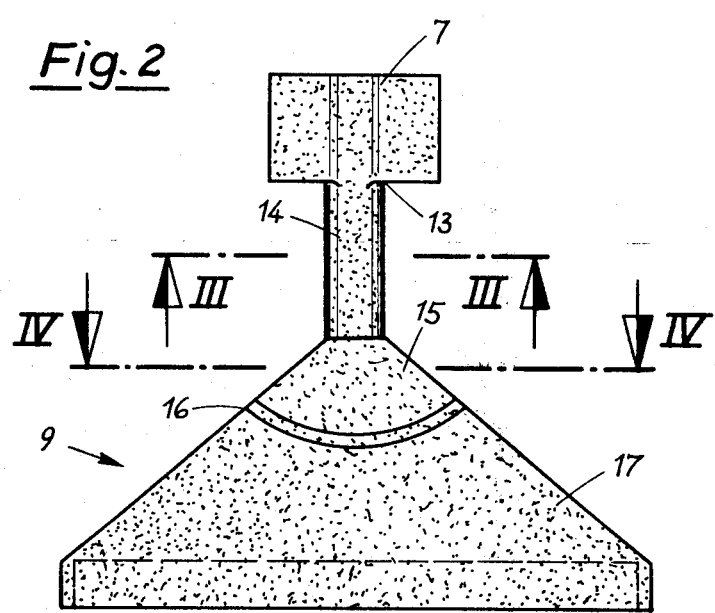
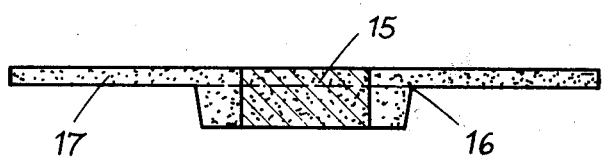

FEEDHEAD DEVICE FOR THE MOULDING OF PLASTICS MATERIALS TO BE FORMED FROM A PLURALITY OF LIQUID CONSTITUENTS

This is a continuation of application Ser. No. 288,584, filed Sept. 13, 1972, and now abandoned.

The invention relates to a feedhead device for the moulding of plastics materials, especially foamable plastics, to be formed from a plurality of liquid constituents. Such a feedhead device has a mixing chamber to be charged with the pressurised constituents and a sprue runner adjoining the mixing chamber and leading to a mould cavity.

In feedhead devices of the above described kind liquid synthetic materials fed into the mixing chamber under pressure are mixed and urged along the sprue runner into the mould cavity which is at atmospheric pressure. Especially when using higher delivery pressures of the plastics constituents arriving in the mixing chamber, rapid flow velocities are to be expected in the sprue runner and this may result in undesirable turbulence. As a result of such turbulence there is the risk of the formation of air occlusions which detrimentally affect the moulding produced. From the standpoint of processing technique it has therefore proved advantageous to give the sprue runner a cross-section which widens towards the mould cavity and to make the exit cross-section of the sprue runner as large as possible, so as to obtain slow exit velocities of the mixture of liquids.

Since any residue left in the mixing chamber and in the sprue runner after filling the mould and hardening of the reaction mixture must be removed as solids and thus must be regarded as material lost, the volume of the mixing chamber is designed to be as small as possible with a view to keeping this loss to a minimum. The comparatively high delivery pressures at which the plastics constituents are conveyed into the mixing chamber also make small mixing chamber volumes possible. From this it follows that the cross-section of the mixing chamber will be considerably smaller than the exit cross-section of the sprue runner to the mould cavity. It has, however, now become apparent that in such a case the desired retardation is attained only incompletely since an uneven exit velocity distribution having a high maximum centrally of the sprue runner develops over the width of the exit opening. This in turn causes a steep pressure drop, from delivery pressure to almost atmospheric pressure, directly adjacent the mixing chamber and this pressure drop is particularly disadvantageous when the mixture of plastic materials contains volatile constituents which tend to evaporate at low pressures. Gas bubbles will thereby be formed in the sprue runner and the proportion of such volatile constituents in the mixture is reduced by the evaporation.

It is an aim of the present invention to provide a feedhead device of the above described kind in which a uniform velocity distribution results over the sprue runner cross-section in spite of wide flaring of the sprue runner toward the mould cavity.

According to the present invention there is provided a feedhead device for feeding and mixing a plurality of liquid constituents, comprising a mixing chamber adapted to be charged with the pressurised constituents, and a sprue runner which adjoins the mixing chamber, flares toward the mould cavity and has at least one restriction formed therein.

By virtue of such an arrangement, at least one but suitably several restrictions along the sprue runner causes the pressure of the plastics mixture to be intermittently reduced, starting from the mixing chamber, since stagnation volumes of substantially constant form upstream of the restrictions. It is thereby ensured that evaporation of volatile components, e.g. blowing or foaming agents, does not occur until the beginning of the inter-reaction of the plastics constituents. The risk of evaporation is greatest directly downstream of the mixing chamber and so the first or single restriction is suitably directly adjacent the mixing chamber.

By virtue of the one or several restrictions in the sprue runner the velocity distribution over the cross-section now becomes very closely uniform since the ratio of on the one hand the cross-sections of the individual stagnation volumes created by the restrictions to on the other hand the cross-sections of the succeeding zones of the sprue runner is more advantageous.

Adjacent the restriction the sprue runner is suitably formed as a diffuser and when a plurality of restrictions is formed in the sprue runner a diffuser is provided downstream of each restriction. The desired conversion of kinetic energy to pressure energy occurs in every diffuser. In this manner the exit flow pattern can be additionally regulated.

The restrictions in the sprue runner may be formed in the most varied ways. The restriction directly following the mixing chamber is conveniently formed by an all-round narrowing of the cross-section which is preferably followed by a sprue runner section of constant cross-section. The throttling effect is thereby intensified and an excessively rapid lowering of pressure within the stream is prevented. The restriction may also be formed by a shoulder in only one of the walls of the sprue runner and projecting thereinto. This is suitable when the configuration of the cross-section of the sprue runner downstream of the restriction is not meant to be altered.

In order that the present invention may more readily be understood, the following description is given of preferred exemplary embodiments, reference being made to the accompanying drawings.

In the drawings:

FIG. 1 shows diagrammatically in longitudinal section a feedhead device secured to a mould;

FIG. 2 shows a view from above onto a hardened casting the shape of which reproduces the inventive configuration of the sprue runner;

FIG. 3 shows a section along line III—III of FIG. 2;

FIG. 4 shows a section along line IV—IV of FIG. 2 viewed parallel to the axis of the sprue runner inclined with respect to the exit opening (cf. FIG. 1);

Figure 6:
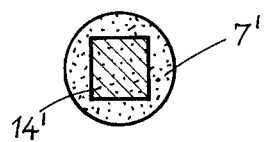
FIG. 6 shows a section along line VI—VI of FIG. 5.

FIG. 1 shows diagrammatically a feedhead device essentially comprising a mixing head 1, a block 3 threadedly clamped to the mould 2, and a control block 4 housing a fluid pressure operated piston 5 for actuation of a closure slider 6. A mixing chamber 7, defined by the mixing head 1 and the block 3, is communicated with a sprue runner 9 extending through the block 3 to the mould cavity 8 of the mould 2. In the exemplary embodiment illustrated the sprue runner 9 debouches in a space 10 through which the closure slider 6 extends after termination of filling the mould.

Plastics materials in liquid form are fed under pressure to the mixing chamber 7 via lines 11, only one of which is shown, and via valves, not shown, through bores 12 of which only one is shown. Thorough mixing of the individual constituents is thus obtained in the mixing chamber.

The configuration of the mixing chamber 7 and the sprue runner 9 is apparent from FIGS. 2 to 7 which show a solidified casting obtained by dismantling the freehead device 1, 2, 3 without first flushing out the plastics material. From FIG. 3 it can be seen that the mixing chamber portion 7 has a rhomboidal cross-section, the inflow of the various individual plastics components occurring at the wall surfaces lying to either side of the axis of symmetry of the mixing chamber portion. The transition from the mixing chamber 7 to the sprue runner 9 is in the form of a distinct restriction 13 which results from a narrowing to a runner portion 14 of constant circular cross-section. This runner portion 14 itself assists the throttling effect of the restriction 13 since the mixture flowing therethrough cannot be appreciably relieved of pressure directly after the restriction.

Downstream of the runner portion 14 the sprue runner widens to a diffuser 15 of substantially rectangular cross-section having an angle of wall divergence of approximately 100°. A further restriction 16, in the form of a shoulder protruding from the upper wall of the sprue runner 9, adjoins the diffuser space 15. This shoulder reduces the runner cross-section in step-like manner and thus clearly separates the diffuser space 15 from the downstream widening sprue runner 9 adjoining the restriction 16.

Figure 7:
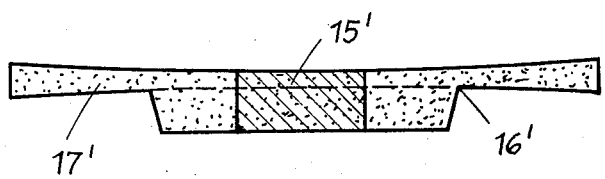
FIG. 7 shows a section along line VII—VII of FIG. 5 similar to the illustration of FIG. 4.

In FIG. 2 the ledge-like widening created by the space 10 is indicated on the casting in broken lines but for reasons of clarity this has been omitted from FIGS. 4 and 7.

It is also apparent from FIG. 2 that the shoulder forming the second restriction 16 is circularly arched in the flow direction, a feature which for reasons which will be explained hereinafter provides special advantages.

Figure 5:
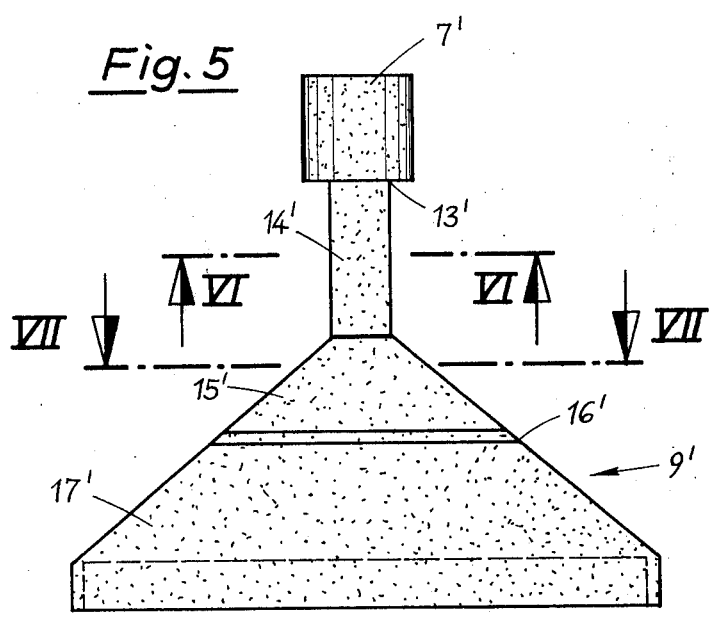
FIG. 5 shows a plan view onto a further hardened casting from which a modified configuration of the sprue runner is apparent.

FIGS. 5 to 7 merely show other possibilities of forming the restrictions envisaged in the sprue runner of FIGS. 2 to 4. In this alternative embodiment a runner portion 14' of constant but in this case rectangular cross-section adjoins the circular cross-section mixing chamber 7', and the opening of the runner portion 14' into the mixing chamber 7' acts as a restriction 13'. The runner portion 14' is again succeeded by a diffuser space 15' into which a shoulder on the upper runner wall projects as a further restriction 16'. However, in contrast to the shoulder 16 of the embodiment of FIGS. 2 to 4 this shoulder is not curved but extends rectilinearly perpendicularly of the runner axis. It is apparent from FIG. 7 that in the present embodiment the cross-section of the sprue runner 9' is substantially rectangular but with inwardly dished upper and lower sides.

In both the embodiments illustrated the shoulder representing the restriction 16 or 16' does not project at a right angle to the upper wall of the sprue runner 9 or 9' but is somewhat inclined in the flow direction. In this way plastics residues are prevented from settling in the corner formed by this shoulder. In both embodiments the remainder of the sprue runner adjoining and downstream of the restriction 16 or 16' is formed as a diffuser space 17 or 17'.

The injection device according to the invention operates as follows:

The various reaction constituents are mixed together under elevated pressure in the mixing chamber 7, 7'. The mixture exits from chamber 7, 7' through the first restriction 13, 13' such that a sufficiently high dynamic pressure is built up in the mixing chamber 7, 7' by the throttling effect definitely to prevent any evaporation of volatile components. This dynamic pressure is for example of the order of magnitude of 10 atmospheres. After traversing the first restriction 13, 13' the kinetic energy of the mixture of liquids is converted to thrust energy in the first diffuser 15, 15', but simultaneously there occurs a reduction of the static pressure in relation to the mixing chamber pressure by virtue of the inevitable pressure gradient toward the mould cavity 8. Thus a pressure of for example 3 atmospheres develops in the first diffuser 15, 15'.

In the embodiment of FIGS. 2 to 4 the liquid leaving the first diffuser 15 forms, on passing the second restriction 16, a surging flow the pattern whereof is adapted to the geometry of the succeeding second diffuser 17. Since the plan geometry of the diffuser 17 corresponds to an isosceles triangle and the restriction 16 is circularly arched in the flow direction, a largely uniform distribution of velocity is obtained over the exit cross-section of the sprue runner 9. The static pressure prevailing in the first diffuser 15 is relieved, via the second diffuser 17, to the atmospheric pressure prevailing in the mould cavity 8 or to a slightly higher pressure.

By virtue of the rectilinear restriction 16' shown in FIGS. 5 to 7, and the greater cross-sectional level at the lateral edges of the second diffuser 17', there results over the width of the sprue runner a varying throttling effect which is more pronounced in the centre of the runner. The paths traversed by the liquid from the end of the runner portion 14' to the restriction 16' are of varying length in this configuration and this also has an effect on the pressure drop at the restriction. The proposal described above enables a uniform distribution of velocities over the width of the sprue runner, and more particularly over the width of the sprue runner mouth, to be obtained and the mixing chamber pressure is intermittently reduced to the atmospheric pressure prevailing in the mould cavity so that the occurrence of evaporation prior to interreaction of the constituents of the mixture is prevented. It is thus possible to employ small mixing chamber volumes in spite of relatively large cross-sections of the sprue runner mouth.

An additional reduction of the mixing chamber volume, and with it a reduction of the loss of material caused by the lost sprue, is possible by rendering the mixing chamber volume variable using movable portions to form the mixing chamber. The full volume of the mixing chamber may then be present during injection but immediately thereafter the mixing chamber may be reduced to a smaller residual volume by driving together the movable portions, e.g. a mixing chamber bottom and a mixing chamber cover.

The invention is not limited to the illustrated exemplary embodiments. For example the mixing chamber and the sprue runner can be formed in a quite different manner by using for the feedback device other parts than those illustrated in FIG. 1. Moreover, the throttling effect in the sprue runner is also advantageously effective in such cases in which the sprue runner, for example because of comparatively low mixing pressures, is flared only slightly or not at all when intended for very volatile constituents which tend to evaporate prior to their reaction even at a low pressure drop.

The closure slider 6 provided in the illustrated exemplary embodiment is not an essential part of the injection device of the invention. This closure slider merely enables larger exit cross-sections of the sprue runner to be used and provides favourable ratios with respect to the width and height of the feedhead.

I claim:

1. A feedhead device for feeding and mixing a plurality of liquid constituents to a mould cavity, which comprises: a mixing chamber means for charging the mixing chamber with said constituents under pressure; a sprue runner which adjoins the mixing chamber and flares toward said mould cavity; and flow restrictor means formed in said sprue runner, said flow restrictor means being formed by at least one shoulder of a runner wall projecting into said sprue runner.

2. The feedhead device as set forth in claim 1, wherein said shoulder is of arch-liked, curved form.

3. A feedhead device for mixing a plurality of liquid constituents to be introduced into a mould cavity, which comprises: a feeder means for charging a mixing chamber with said constituents under pressure; a sprue runner for providing fluid communication from said mixing chamber to said mould cavity, said sprue runner having a runner portion of constant cross section adjoining said mixing chamber and a runner portion of increasing cross section toward said mould cavity; and flow restrictor means formed in said sprue runner, said flow restrictor means comprising a plurality of restrictions.

4. The feedhead device as set forth in claim 1, wherein the sprue runner is formed as a diffuser adjacent each restriction.

5. The feedhead device as set forth in claim 1, wherein adjacent at least one of said restrictions the sprue runner has a cross-section which is at least partially constant.

6. A feedhead device as set forth in claim 1, wherein one of said restrictions directly adjoins the mixing chamber.

7. A feedhead device as set forth in claim 1, wherein at least one of said restrictions comprises an all-round narrowing of the sprue runner cross-section.

8. The feedhead device as set forth in claim 1, wherein adjacent at least one of said restrictions, the cross-sectional shape of said sprue runner is altered.

* * * * *

UNITED STATES PATENT OFFICE
CERTIFICATE OF CORRECTION

Patent No. 3,995,981          Dated December 7, 1976

Inventor(s) BERND FRIES

It is certified that error appears in the above-identified patent and that said Letters Patent are hereby corrected as shown below:

Column 2, line 5, after "constant" insert --pressure--;

Column 3, line 12, "freehead" should be --feedhead--;

Column 4, line 64, "feedback" should be --feedhead--.

Signed and Sealed this thirtieth Day of August 1977

[SEAL]

Attest:

RUTH C. MASON
*Attesting Officer*

C. MARSHALL DANN
*Commissioner of Patents and Trademarks*